UNITED STATES PATENT OFFICE.

STANLEY HERBERT LAWTON, OF WILMINGTON, DELAWARE, ASSIGNOR TO AMERICAN VULCANIZED FIBRE COMPANY, OF WILMINGTON, DELAWARE, A CORPORATION OF DELAWARE.

METHOD OF TREATING FERRUGINOUS ZINC-CHLORID SOLUTIONS.

1,137,871. Specification of Letters Patent. Patented May 4, 1915.

No Drawing. Application filed June 21, 1913. Serial No. 775,100.

*To all whom it may concern:*

Be it known that I, STANLEY HERBERT LAWTON, a citizen of the United States, residing at Wilmington, in the county of New Castle and State of Delaware, have invented certain new and useful Improvements in Methods of Treating Ferruginous Zinc-Chlorid Solutions, of which the following is a specification.

This invention relates to the treatment of iron-bearing zinc chlorid solutions, such as are obtained for example by the treatment of galvanized scrap by hydrochloric acid, or from other sources, one object of the invention being to prepare therefrom commercially pure zinc chlorid, the iron being separated in the form of anhydrous ferric oxid.

The invention likewise relates broadly to the dehydration of ferric salts or compounds by zinc chlorid.

In practising the invention, advantage is taken of the heretofore unobserved fact that highly-concentrated solutions of zinc chlorid are capable, under certain conditions, of dehydrating ferric compounds, as ferric hydroxid, with formation of anhydrous ferric oxid.

According to the invention, as applied to the purification of zinc chlorid solutions, the ferruginous zinc chlorid solution from any source receives, either before or during concentration, any suitable basic addition, in quantity approximately proportionate to the ferric salt present. In case the iron is originally present in the ferrous state, it is preliminarily converted into the ferric condition by any suitable methods, as for example by treatment with nitric acid, chlorin, zinc nitrate or the like. The basic addition referred to is preferably a zinc compound or basic character, as the oxid, carbonate, basic chlorid or the like, the purpose of the addition being to effect the immediate or ultimate precipitation of the ferric iron in oxidized form (hydroxid or oxid). The liquor is concentrated to such degree, and under such conditions, that the iron is ultimately thrown out, under the dehydrating action of the zinc chlorid, in the form of anhydrous ferric oxid.

In case the proportion of iron in the original solution is relatively small, say not in excess of about one per cent. of the zinc present, a direct addition of basic compound is usually unnecessary for the reason that the loss of hydrochloric acid during the concentration will result in the formation of a corresponding proportion of zinc oxid or other basic zinc compounds, which will suffice for the precipitation of small proportions of iron. Where larger proportions of iron are present, or where the conditions of the concentration are such that very little decomposition of the zinc chlorid occurs, the basic addition is made directly to the solution.

In quantity the basic addition may be chemically equivalent to the ferric iron present, but in such case the resulting purified zinc chlorid will usually be somewhat basic in character, owing to the above-mentioned decomposition during concentration. The recovered ferric oxid may also contain some zinc hydroxid. It is preferred therefore to add the basic compound in somewhat less proportion than the chemical equivalent of the iron, the exact proportion depending to some degree upon the temperature and other conditions obtaining during the subsequent concentration. As a general, but of course not an invariable rule, it has been found satisfactory to make the basic addition chemically equivalent to the excess of ferric iron above one per cent., based upon the weight of zinc present. In case vacuum evaporation is employed, a slightly larger basic addition is desirable to compensate for the decreased loss of hydrochloric acid.

The solution is now concentrated either in open pans or *in vacuo*. At a concentration materially above 70° Baumé, and usually about 85 to 95° Baumé, depending upon the proportion of iron and the time and other conditions of evaporation, the iron separates quantatively and ultimately assumes the form of finely-divided or finely-granular anhydrous ferric oxid. The physical character of the precipitated oxid is such that it is very readily separated, either by filtration or by decantation, as compared with ferric hydroxid. For ease of separation, it is desirable or necessary again to dilute the solution, say to 50 or 55° Baumé, at which dilution the anhydrous ferric oxid settles rapidly and completely, and a perfectly clear and purified zinc chlorid solution if obtainable by simple decantation. This solution may be re-concentrated to 70° Baumé, or even to dryness according to the use to which it is to be applied. The re-concentration is preferably carried out in copper or other suitable vessels to avoid further contamination by iron.

In certain cases it is preferred to modify the procedure to the extent that the original evaporation is continued beyond the point at which the ferric compound undergoes dehydration, and even to dryness or to such degree that the product assumes a solid form on cooling. The resulting product, in which the anhydrous ferric oxid is intimately commingled with zinc chlorid, is well adapted for storage or shipment. At any subsequent time or place it may be dissolved in water and filtered or decanted at a dilution suitable for these operations, being subsequently re-concentrated if desired under conditions preventing further contamination by iron as above described.

The process may serve also for recovering the values from the so-called slimes produced in the puring of hard or vulcanized fiber, and in other stages of the manufacture. These slimes consist chiefly of basic compounds of zinc and ferric hydroxid or basic ferric salts, and may be introduced directly into the zinc chlorid solution, prior to the evaporation, together with such further additions either of ferric salts or compounds or of basic zinc salts or compounds as may be required to provide the proper conditions, as above set forth, for the recovery of iron as ferric oxid.

In case the original solution contains some sulfate of iron, the purified chlorid solution will of course contain a corresponding proportion of zinc sulfate, which is however not objectionable for certain purposes.

The expression "hydrated ferric compound" is herein employed as including dissolved ferric salts, as well as hydrated oxy-compounds, such as ferric hydroxid, basic ferric salts, etc.

It is to be understood that, as in the case of most chemical reactions, time, temperature and concentration are, within proper limits, to be regarded as mutually convertible factors, so that the invention is not limited to the specific conditions above set forth by way of illustration.

I claim:—

1. The method of dehydrating ferric compounds, which consists in acting thereon with a concentrated solution of zinc chlorid.

2. The method which consists in reacting with a concentrated solution of zinc chlorid upon a dissolved ferric salt, in presence of a precipitant for iron, thereby precipitating the iron as anhydrous ferric oxid.

3. The method of purifying zinc chlorid solutions containing ferric compounds, which consists in concentrating said solutions until the iron is converted into anhydrous ferric oxid.

4. The method of treating zinc chlorid solutions containing dissolved ferric salts, which consists in introducing thereinto a precipitant for iron, and concentrating said solution until the iron is converted into anhydrous ferric oxid.

5. The method of treating zinc chlorid solutions containing dissolved ferric salts, the iron being in excess of one per cent. of the zinc, which consists in introducing into said solutions a precipitant for iron, and concentrating the solution until the iron is converted into anhydrous ferric oxid.

6. The method of treating zinc chlorid solutions containing dissolved ferric salts, which consists in introducing thereinto a basic zinc compound, and concentrating said solution until the iron is converted into anhydrous ferric oxid.

7. The method of treating zinc chlorid solutions containing dissolved ferric salts, which consists in introducing thereinto oxid of zinc, and concentrating said solution until the iron is converted into anhydrous ferric oxid.

8. The method of preparing zinc chlorid solutions free from iron, which consists in concentrating a zinc chlorid solution containing a hydrated ferric compound until the iron is converted into anhydrous ferric oxid, then adding water and separating the ferric oxid from the diluted solution.

9. The method of preparing zinc chlorid solutions free from iron, which consists in concentrating a zinc chlorid solution containing a hydrated ferric compound until the iron is converted into anhydrous ferric oxid, then adding water and separating the ferric oxid from the diluted solution and finally evaporating the purified solution.

10. The method of treating ferruginous zinc chlorid solutions to obtain commercially pure zinc chlorid, which consists in adding to such solution a precipitant for iron in proportion somewhat less than the chemical equivalent of the ferric iron present, and evaporating the resulting liquor until the iron is converted into anhydrous ferric oxid.

11. In a method of preparing zinc chlorid solutions free from iron, the step which consists in concentrating a zinc chlorid solution containing a hydrated ferric compound until the iron is converted into anhydrous ferric oxid, and continuing the evaporation until the product assumes a solid condition upon cooling.

12. In a method of preparing zinc chlorid solutions free from iron, the step which consists in concentrating a zinc chlorid solution containing a dissolved ferric salt and a precipitant for iron until the iron is converted into anhydrous ferric oxid and continuing the evaporation until the product assumes a solid condition upon cooling.

In testimony whereof I affix my signature in presence of two witnesses.

STANLEY HERBERT LAWTON.

Witnesses:
    CHARLES ALMY, Jr.,
    W. J. ROBINSON.